March 26, 1957 J. A. EWING 2,786,275
SURVEYING INSTRUMENTS

Filed June 3, 1953 2 Sheets-Sheet 1

Inventor:
John Alister Ewing,
by Singer, Stern & Carlberg
Attorneys.

March 26, 1957 J. A. EWING 2,786,275
SURVEYING INSTRUMENTS
Filed June 3, 1953 2 Sheets-Sheet 2

Inventor:
John Alister Ewing,
by Singer, Stern & Carlburg
Attorneys.

United States Patent Office 2,786,275
Patented Mar. 26, 1957

2,786,275
SURVEYING INSTRUMENTS

John Alister Ewing, Perth, Western Australia, Australia, assignor to E. Esdaile & Sons Pty. Limited, Sydney, New South Wales, Australia, a corporation of New South Wales Application June 3, 1953, Serial No. 359,348

Claims priority, application Australia July 7, 1952

12 Claims. (Cl. 33—46)

The present invention relates to surveying instruments and has for its object the provision of an instrument by means of which the taking of levels is simplified and which, in a preferred form, will provide a direct reading of the reduced level of an observed station, and from which the horizontal distance to the observed station may be ascertained simply.

With the instruments at present used by surveyors it is necessary to make some sort of calculation based on data obtained from observation in order to obtain the reduced level of an observed station and while such calculations present no particular difficulties from a mathematical point of view they have to be repeated many times over in an extensive survey and a considerable amount of time has to be spent in making them. Furthermore each calculation made provides an opportunity for error. Thus the provision of an apparatus for giving a direct reading of reduced level may be considered a substantial contribution to the art.

A surveying instrument according to the invention comprises a sighting telescope mounted so as to be capable of being pivotably elevated and depressed in a vertical plane and having a graticule of spaced lines for application of the stadia principle, pointer means and a chart having plotted thereon a plurality of points each being plotted at a distance from a datum corresponding to the vertical interval between an observing and an observed station and indicia on the chart indicative of the intercept that would be observed on a surveying staff between the stadia lines under the conditions represented by each point, the chart and the pointer means being constructed and arranged so that a pivotal movement of the telescope in a vertical plane produces a corresponding relative movement in one sense between them, manually operable means such that operation thereof in accordance with the observed staff intercept produces relative movement of the chart and the pointer means in a second sense to bring the pointer means and a point of the chart corresponding to the vertical interval between the observing and an observed station opposite one another and indicating means constructed and arranged to provide an indication in units of length of the vertical interval between observed and observing stations on completion of relative movement in said second sense.

It is preferred that the said indicating means is such that a known vertical interval of the observing station relative to a given datum may be set on said means so that a direct reading of the reduced level of the observed station is given.

In order that the invention may be better understood and put into practice a preferred embodiment thereof is hereinafter described by way of example with reference to the accompanying drawings in which Figure 1 is a perspective view of a Hilger and Watts No. 1 Microptic Theodolite modified to incorporate the invention.

Figure 1:
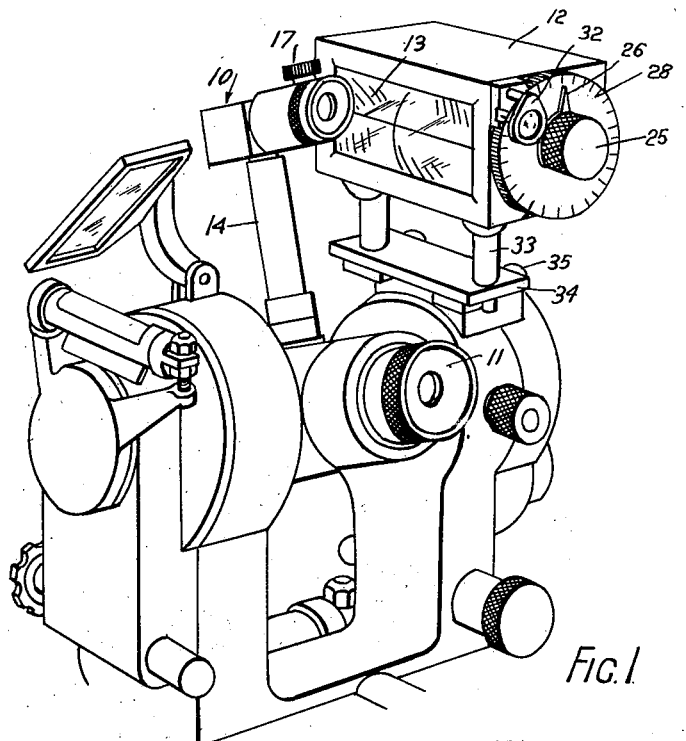
Figure 2:
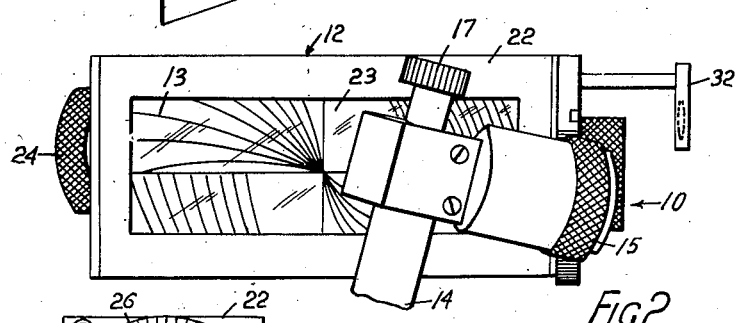
Figure 2 is a view in elevation of those portions of the apparatus shown in Figure 1 which are directly concerned with the present invention.

Before describing the preferred embodiment it is proposed to describe the general principles underlying the invention and the basis on which an instrument embodying the invention may be constructed. In practice the invention is conveniently applied as an adjunct to an existing theodolite, alidade or other similar instrument having a graticule of spaced lines for application of the stadia principle and it will be described as such. A special instrument embodying the invention may of course be constructed.

A preferred method for converting an instrument of the kind mentioned for the purposes of the invention consists in making an attachment to fit it, such that when the telescope of the instrument is elevated or depressed a telescopic or other type of reader or pointer attached to the telescope moves with the telescope at the same rate as it, or any other increased rate as may be desired: such increased rate of movement being obtained by the introduction of suitable gearing.

Assuming that a telescope reader is used, the graticule of the telescopic reader is arranged to focus on and describe, when the main telescope of the instrument is rotated, a path on an attached or built-in graph, chart or diagram, fixed to the horizontal axis standard or other suitable part of the instrument. The path so described by the graticule will be the arc of a circle of a radius equal to the distance of the graticule from the centre of the horizontal axis of the telescope. This radius will be decided by the type of instrument used and the accuracy of the required result. To make a suitable graph, chart or diagram, the arc so described is drawn on a sheet of suitable material. The length of the arc will be determined by the intended vertical range of the device. The device may for example be made to be capable of ascertaining the reduced levels of stations situated between an elevation or depression of 45° of the telescope from the point of observation.

From the middle of the arc is drawn a line to the centre of the circle of which the arc forms part. This line is referred to below as the "centre line." Lines suitably inscribed are drawn on the sheet, each line corresponding to the observed intercept on a levelling staff held vertically at a range of observed stations for which the intercept is the same and are referred to below as "intercept lines." The number of intercept lines is as many as are found desirable to allow for ease in reading of the diagram and to permit accurate interpolation of various staff intercepts for which lines are not actually drawn on the diagram.

The positions of the intercept lines to be drawn on the diagram are determined in the following manner. The position of any point on an intercept line is found by calculating the vertical component of the station which would be observed for any setting of the instrument.

The position of the point on the arc already described which the graticule will occupy when the telescope is pointing at such altitude or depression is then marked. When such position is an altitude, the point on the arc will be on one side of, and when a depression it will be on the other side of the intersection of the arc and the centre line which will indicate a zero reading of altitude or depression. From the position thus fixed on the arc is plotted the vertical component ascertained above in a direction parallel to the centre line. In the case of an altitude, the component is plotted upwards from the arc, and in the case of a depression, downwards. A convenient scale is chosen to which the vertical components are plotted for all points on all the intercept lines on the diagram. The intercept lines are found by joining all points representing the same staff intercept and each line is marked at convenient points with the corresponding staff intercept or a figure proportional to it so that these can be seen through the telescopic reader.

The device is designed for ascertaining reduced levels of stations within a predetermined maximum vertical distance above or below the position of the observer. Such maximum may be say, ten, one hundred, two hundred, etc. feet, according to the accuracy required to be obtained. Assuming that the maximum range is to be 100 ft. then the staff intercept lines on the diagram will end when the vertical component reaches 100 ft. Thus if the diagram is in the form of a cylinder, one rotation of it will indicate a vertical component of 100 ft.

The diagram is fixed to the instrument in such a way as to be movable in a direction parallel to the centre line of the diagram and the centre line of the diagram is so placed that it passes through the centre line of the horizontal axis of the telescope or the axis produced, and the plane of the diagram is at right angles to the centre line of the axis. The diagram may be in the form of a plane or may be inscribed on a cylinder. If the diagram is in the form of a plane it is placed so that the distance from the intersection of the arc and the centre line is exactly equal to the pre-determined radius of the graticule, and if in the form of a cylinder the axis of the cylinder is placed at a distance from the axis slightly less than the radius, so that the measurement from the graticule to the diagram at the point of intersection of the arc and the centre line is approximately the same as that from the graticule to the arc when the telescope is either elevated or depressed to ten degrees; this is to reduce parallax. Alternatively, if a focussing arrangement is fitted to the telescopic reader the axis of the cylinder may be situated at the same distance from the centre line of the axis as the predetermined radius. In operation the movement of the plane or cylindrical diagram (which will appear when viewed through the reader) to bring the appropriate staff intercept into coincidence with the graticule, is communicated to a suitably designed drum or wheel in such a manner that the vertical component traversed by such movement of the drum or wheel past a fixed mark will be indicated in feet, etc. or parts thereof, inscribed on the drum or wheel. The wheel or drum may be designed so that it may be rotated independently of the movement of the diagram, so that when the diagram is held with the graticule coinciding with the intersection of the arc and the centre line when the telescope is pointed in a truly horizontal position, the drum may be rotated until the reading on the drum as indicated by the fixed mark corresponds with the reduced level of the observed station, and the drum or wheel is held in this position by clamping or by friction in such a way that any movement of the diagram will be communicated to it. This is a refinement which adds appreciably to the value of the invention in giving a direct reading of reduced levels but is not an essential part of it. The same result may be achieved even more conveniently in the manner set out in detail in connection with the specific embodiment of the invention described below.

In Figure 1 of the drawings a preferred embodiment of the invention is shown attached to a No. 1 Microptic Theodolite manufactured by Messrs. Hilger and Watts Ltd., London, England. This is a standard instrument and will not be described except insofar as is necessary for an understanding of the present invention.

The invention comprises two main portions, the telescopic reader 10 which is mounted on the theodolite telescope 11 and the mounting and container 12, or the diagram 13, the former being fixed on the main frame of the theodolite.

The telescopic reader 10 is secured to the telescope 11 by means of an arm 14 which is at right angles to the axis of the telescope. The telescopic reader is the equivalent of a simple pointer and when the telescope is tilted about a horizontal axis a graticule in the telescopic reader traces out an arc as would the end of a pointer attached in a similar position. The graticule does in fact act as a pointer in relation to the diagram 13, which being curved, would make it difficult to construct a purely mechanical pointer satisfactorily.

The telescopic reader consists principally of an eyepiece 15, a pentagon prism 16 (Figure 4) and a suitable mounting for these parts arranged as shown in the drawings. To provide a graticule or a fixed mark to indicate a definite position on the diagram a small extension piece 17 is provided in which there is a wall 18 having a central pinhole, light passing through this pinhole falls on the partially silvered mirror 19 (Figure 5), the axial distance from the pinhole to the mirror being equal to the distance from the mirror to diagram 13. Thus when looking through the eyepiece 15 there is seen a portion of the diagram 13 and, in the centre of the field of vision, a bright pin point of light. It is this which forms the graticule and acts as the pointer, in that for any position of the telescope 11, it indicates a definite point on the diagram.

Figure 3:
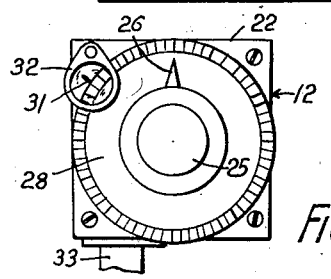
Figure 3 is an end view of the apparatus shown in Figure 2.
Figure 4:
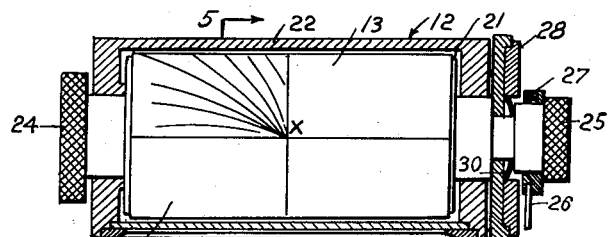
Figure 4 is a partly sectioned plan view of the apparatus shown in Figure 2.
Figure 5:
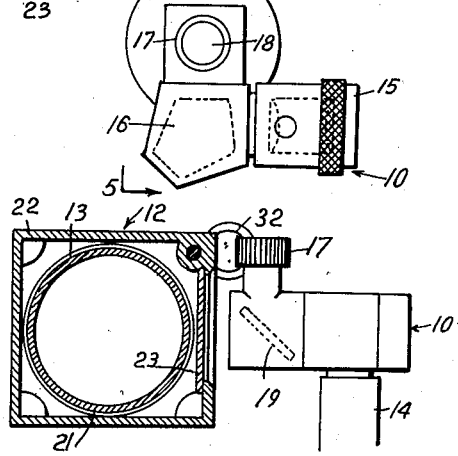
Figure 5 is a section on 5—5 of Figure 4.

The diagram 13 itself is mounted on a cylinder 21 which is rotatably mounted in the casing 22. A portion of the surface of the diagram 13 opposite the telescopic reader is visible through the glass window 23 in the casing 22. A knurled knob 24 is fixed to one end of the cylinder and is used for rotating the cylinder. A second knurled knob 25 is secured to the other end of the cylinder for the same purpose. To this knob there is attached by means of the set screw 27 a pointer 26. Between the knob 25 and the casing 22 is mounted a disc 28 the outer edge of which is mounted and which bears on its outer face a circumferential scale (Figure 3). The disc 28 is rotatable relative to the cylinder 21 but is in frictional engagement with it through the spring washer 30 (Figure 4). If either of knobs 24 or 25 is turned the disc 28 will normally turn also. The disc may however be manually held against rotation if required. The scale on the disc is numbered in a suitable measure of length, for example, feet. An index mark 31 (Figure 3) is inscribed on the casing 22. A small lens 32 slidable into and out of the casing is provided to assist in reading the scale on the disc. The position of the pointer 26 relative to the chart 13 is such that when the theodolite telescope is horizontal and the point X coincident with the graticule of the telescopic reader, the pointer 26 is opposite the index mark 31.

The casing 22 is attached to the theodolite by means of the pillars 33, mounting plate 34 and set screws 35 so as to be easily demountable.

Figure 6:
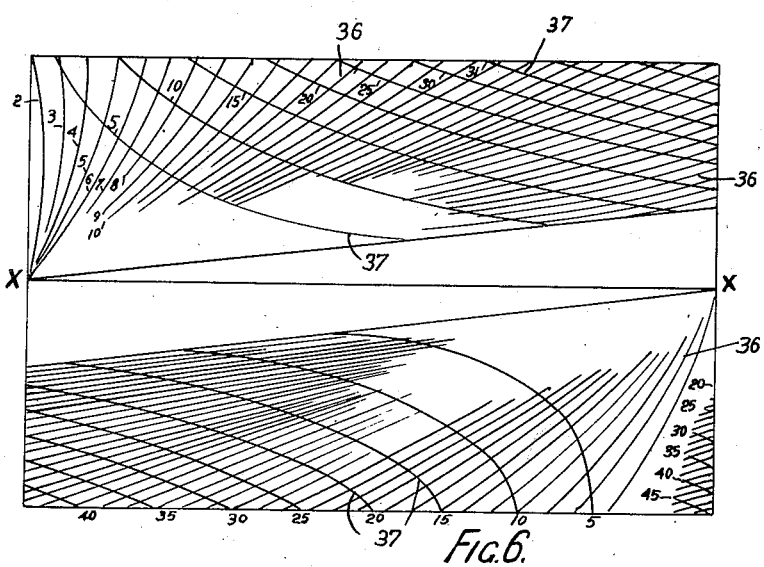
Figure 6 is a representation of one form of chart diagram or graph which may be used, showing some only of the lines and indicia normally marked thereon.

The diagram 13 is shown in complete and flattened out in Figure 6. When in position on a cylinder as shown in Figure 4, the two points X of Figure 6 are coincident at the point X of Figure 4.

There are two sets of lines on the diagram, examples of the first set are marked 36 and examples of the second set 37. Each of the lines 36 join a set of points corresponding to a particular staff intercept, and are marked at intervals with figures (only a few of which are shown) indicative of that intercept, the principle followed in obtaining such set of lines has already been described. It should be noted, however, that the natural disposition of the lines will depend on the particular form and size of diagram used and the position of these may be found either empirically or by a calculation depending on the geometry of the system. The purpose of the second set of lines 37 will be described below.

With the device described above it is possible to ascertain the reduced level of a distant station within the range of the device by the following procedure:

1. The theodolite, being in adjustment, is truly levelled.
2. The telescope 11 is set in a truly horizontal position.
3. The pointer 26 is set to the height of the station from which the observation is being made on the scale of the disc 28 and the whole cylinder assembly is then rotated to bring the pointer opposite the index mark 31.
4. The telescope is pointed at a vertically held staff, at a station the reduced level of which is required. The slope distance derived from the staff intercept ($\times 100$) is observed and the central graticule of the telescope pointed to the reading on the staff equal to the height of the instrument at the observed station (conveniently five feet).
5. The graticule of the telescopic reader is then viewed through the reader and the diagram rotated until the graticule coincides with the observed staff intercept as indicated on the diagram for that particular inclination of the telescope. The index 31 will then indicate directly on the scale on disc 28 the reduced level of the ground at the station observed, in feet or whatever units are marked on the scale.

In order that the device may be used to ascertain the horizontal distance to the observed station, appropriate reduction lines 37 obtained by calculation are drawn on the diagram which indicate the amount which it is required to reduce the slope distance obtained by multiplying the observed staff intercept by the instrument constant (for instance usually 1; 100). This figure is obtained by interpolation of the position occupied by the graticule between adjacent reduction lines 37 appearing on the diagram. For example if the graticule lay midway between the lines 37 marked 5 and 10 it would be necessary to deduct 7.5 feet (if the units being used are feet) from the slope distance, to obtain the horizontal distance.

The above description relates to one embodiment of the invention and the construction employed to attain the desired result may be varied considerably within the scope of the invention as broadly claimed. For instance, it is possible though not usually convenient to produce a device employing a diagram drawn on a plane disc which rotaes about its centre to bring curved intercept lines into coincidence with the graticule. The positions of the intercept lines being calculated and plotted in such a way that the amount of rotation of the disc corresponds to the vertical component of the station observed. The edge of the disc is marked in suitable units of length and on rotation passes by an index mark which may be moved to correspond with the reduced level of the observing station when the telescope of the instrument is pointing truly horizontal.

Again the device described may readily be arranged so that a diagram in the cylindrical form could be attached to the telescope and the reader attached to the standard of the telescope axis or other suitable part of the instrument. Furthermore a movement of the reader or pointer may be substituted for movement of the diagram in obtaining the final reading of the level.

Relative movement between the diagram and the pointer resulting from a movement of the telescope may be achieved indirectly that is to say by, for example, electrical or hydraulic means.

The variations described above are all dependant for their operation on the principle underlying the invention and the choice of which form is used is largely a matter of convenience. Where the invention is to be applied as an attachment to an existing instrument the form adopted will depend largely on the construction of the instrument to which it is to be attached.

I claim:

1. A surveying instrument comprising a sighting telescope mounted so as to be capable of being pivotably elevated and depressed in a vertical plane and having a graticule of spaced lines for application of the stadia principle, pointer means and a chart having plotted thereon a plurality of points each being plotted at a distance from a datum corresponding to the vertical interval between an observing and an observed station and indicia on the chart indicative of the intercept that would be observed on a surveying staff between the stadia lines under the conditions represented by each point, the chart and the pointer means being constructed and arranged so that a pivotal movement of the telescope in a vertical plane, produces a corresponding relative movement in one sense between them, manually operable means such that operation thereof in accordance with the observed staff intercept produces relative movement of the chart and the pointer means in a second sense to bring the pointer means and a point on the chart corresponding to the vertical interval between the observing and an observed station opposite one another and indicating means constructed and arranged to provide an indication in units of length of the vertical interval between observed and observing stations on completion of a relative movement in said second sense.

2. A surveying instrument comprising a sighting telescope mounted so as to be capable of being pivotably elevated and depressed in a vertical plane and having a graticule of spaced lines for application of the stadia principle, pointer means and a chart, having plotted thereon a plurality of points each being plotted at a distance from a datum corresponding to the vertical interval between an observing and an observed station and indicia on the chart indicative of the intercept that would be observed on a surveying staff between the stadia lines under the conditions represented by each point, the pointer means being mounted on and movable with the telescope and the chart being mounted on a fixed part of the surveying instrument, manually operable means such that by operation thereof in accordance with the observed staff intercept the chart is moved to bring a point on it corresponding to the vertical interval between the observing and an observed station, opposite the pointer means and indicating means associated with the chart which, as a result of such a movement of the chart provides an indication in units of length of the vertical interval between observed and observing stations.

3. A surveying instrument as claimed in claim 1 wherein the indicating means is such that a known vertical interval of the observing station relative to a given datum may be set on said means so that a direct reading of the reduced level of the observed station in relation to the datum is obtained.

4. A surveying instrument as claimed in claim 2 wherein the chart is on the surface of a right cylinder mounted for rotation about an axis parallel to the axis of the telescope when in the horizontal position.

5. A surveying instrument as claimed in claim 2, wherein the pointer means is in the form of a telescopic reader having a graticule therein, the relative positions of the chart and the telescopic reader being such that over a predetermined range of movement of the telescope a portion of the chart is visible in the eye piece of the telescopic reader.

6. A surveying instrument as claimed in claim 5 wherein the graticule comprises a spot of light produced on a part-silvered mirror arranged in the path of vision of the telescopic reader so that the said spot of light forms a graticule for the telescopic reader and is observed simultaneously with the chart.

7. A surveying instrument as claimed in claim 4 wherein the cylinder is formed with a knob at one end whereby the cylinder may be rotated manually, said indicating means includes an annular member having thereon a circumferential scale in units of length mounted for rotation coaxially with the cylinder and in frictional engagement therewith so that the cylinder and annular member may be rotated together or independently, a pointer attached to said cylinder and arranged adjacent said scale, and a fixed index mark positioned adjacent said scale, the positions of the index mark and the pointer being such that when the pointer is set against the index mark a point corresponding to zero vertical interval on the chart is opposite the pointer means mounted on the telescope, when the telescope is in the horizontal position.

8. A surveying instrument as claimed in claim 1 wherein the chart is marked with a second set of indicia from which the horizontal distance between an observing and an observed station corresponding to any staff intercept may be obtained.

9. An adjunct for a surveying instrument having a sighting telescope mounted so as to be capable of being pivotably elevated and depressed in a vertical plane and having a graticule of spaced lines for application of the stadia principle, comprising pointer means adapted to be mounted on the telescope so as to be movable therewith and a chart having plotted thereon a plurality of points each being plotted at a distance from a datum corresponding to the vertical interval between an observing and an observed station and indicia on the chart indicative of the intercept that would be observed on a surveying staff between the stadia lines under the conditions represented by each point, the chart being adapted for mounting on a fixed part of the surveying instrument, there being associated with said chart manually operable means such that by operation thereof in accordance with the staff intercept the chart is moved to bring a point on it corresponding to the vertical interval between the observing an an observed station, opposite the pointer means and indicating means associated with the chart which, as a result of such a movement of the chart, provides an indication in units of length of the vertical interval between observed and observing stations.

10. A surveying instrument as claimed in claim 2 wherein the indicating means is such that a known vertical interval of the observing station relative to a given datum may be set on said means so that a direct reading of the reduced level of the observed station in relation to the datum is obtained.

11. A surveying instrument as claimed in claim 3 wherein the chart is on the surface of a right cylinder mounted for rotation about an axis parallel to the axis of the telescope when in the horizontal position.

12. A surveying instrument as claimed in claim 2 wherein the chart is marked with a second set of indicia from which the horizontal distance between an observing and an observed station corresponding to any staff intercept may be obtained.

References Cited in the file of this patent

UNITED STATES PATENTS

| | | |
|---|---|---|
| 769,526 | Armstrong | Sept. 6, 1904 |
| 2,279,321 | Janssen | Apr. 14, 1922 |
| 2,347,702 | Maris | May 2, 1944 |
| 2,448,965 | Drayer | Sept. 7, 1948 |
| 2,517,779 | Flint | Aug. 8, 1950 |